United States Patent
Miner et al.

(10) Patent No.: US 8,286,784 B2
(45) Date of Patent: Oct. 16, 2012

(54) BELTLESS CONVEYOR SYSTEM

(75) Inventors: Paul H. Miner, Plymouth, MI (US); Gary W. Cook, Parma, MI (US)

(73) Assignee: Wardcraft Conveyor & Die Products a division of McLaughlin Ward & Company, Spring Arbor, MI (US)

( * ) Notice: Subject to any disclaimer, the term of this patent is extended or adjusted under 35 U.S.C. 154(b) by 60 days.

(21) Appl. No.: 12/387,085

(22) Filed: Apr. 27, 2009

(65) Prior Publication Data

US 2009/0266679 A1 Oct. 29, 2009

Related U.S. Application Data

(60) Provisional application No. 61/125,491, filed on Apr. 25, 2008.

(51) Int. Cl.
*B65G 25/00* (2006.01)
(52) U.S. Cl. .............................. 198/750.7; 198/760
(58) Field of Classification Search ............... 198/750.7, 198/768, 760
See application file for complete search history.

(56) References Cited

U.S. PATENT DOCUMENTS

| | | | | |
|---|---|---|---|---|
| 1,011,680 A | * | 12/1911 | Walt | 74/26 |
| 1,022,332 A | * | 4/1912 | Roth | 198/760 |
| 1,810,882 A | * | 6/1931 | Heymann et al. | 198/768 |
| 2,049,346 A | * | 7/1936 | Bebinger | 198/760 |
| 2,473,193 A | * | 6/1949 | Campion | 198/762 |
| 2,678,720 A | * | 5/1954 | Brumagin | 198/760 |
| 3,212,630 A | * | 10/1965 | Allen et al. | 198/768 |
| 4,859,120 A | | 8/1989 | Tsubata et al. | 406/84 |
| 5,732,622 A | | 3/1998 | Lauderbaugh | 100/306 |
| 5,799,778 A | | 9/1998 | Quaeck | 198/750.5 |
| 5,890,301 A | | 4/1999 | Marschke | 34/625 |
| 6,308,821 B1 | * | 10/2001 | Asai et al. | 198/750.7 |
| 6,311,832 B1 | | 11/2001 | Kwasniewicz et al. | 198/619 |
| 6,662,934 B1 | * | 12/2003 | Iida | 198/750.1 |
| 6,899,218 B2 | | 5/2005 | Kwasniewicz et al. | 198/750.7 |
| 6,988,611 B2 | | 1/2006 | Kwasniewicz et al. | 198/750.7 |
| 7,083,042 B2 | | 8/2006 | Kwasniewicz et al. | 198/750.7 |
| 2004/0060802 A1 | | 4/2004 | Kwasniewicz et al. | 198/752.1 |
| 2004/0060803 A1 | | 4/2004 | Kwasniewicz et al. | 198/759 |
| 2006/0000691 A1 | | 1/2006 | Kwasniewicz et al. | 198/750.7 |
| 2006/0201787 A1 | | 9/2006 | Kwasniewicz et al. | 198/750.7 |
| 2009/0016827 A1 | | 1/2009 | Lopez et al. | 406/181 |

* cited by examiner

*Primary Examiner* — Mark A Deuble
(74) *Attorney, Agent, or Firm* — L.C. Begin & Associates, PLLC.

(57) ABSTRACT

A conveyor assembly includes a mounting assembly for moving a material to be conveyed. The mounting assembly is movable in a first direction and in a second direction opposite the first direction. At least one resiliently deformable spring member is provided for storing energy therein responsive to a motion of the mounting assembly in the second direction. Energy stored in the spring member is usable to urge the mounting assembly and the associated material in the first direction.

14 Claims, 4 Drawing Sheets

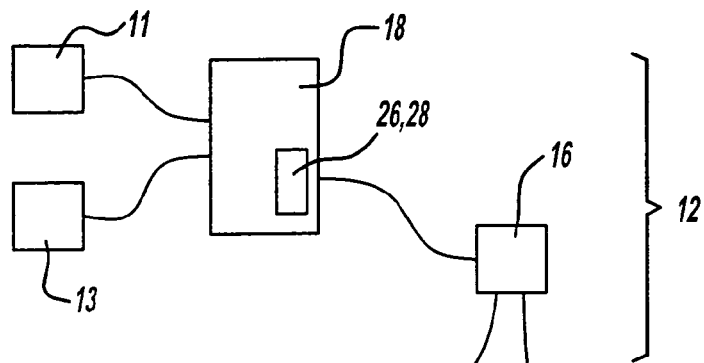
FIG - 1
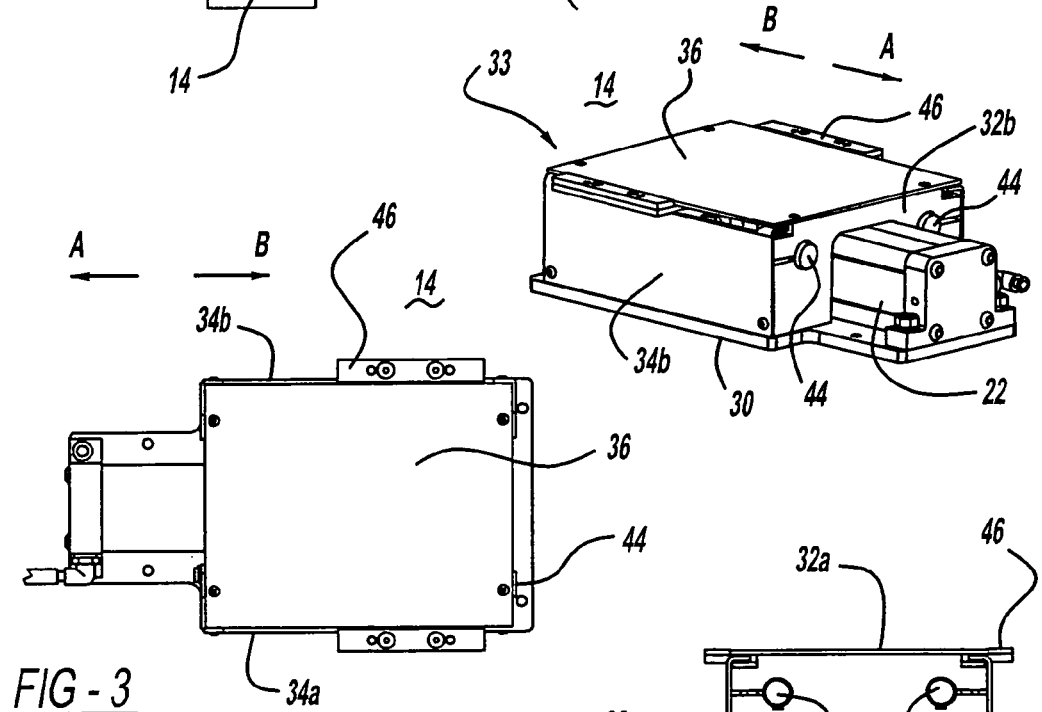
FIG - 2
FIG - 3
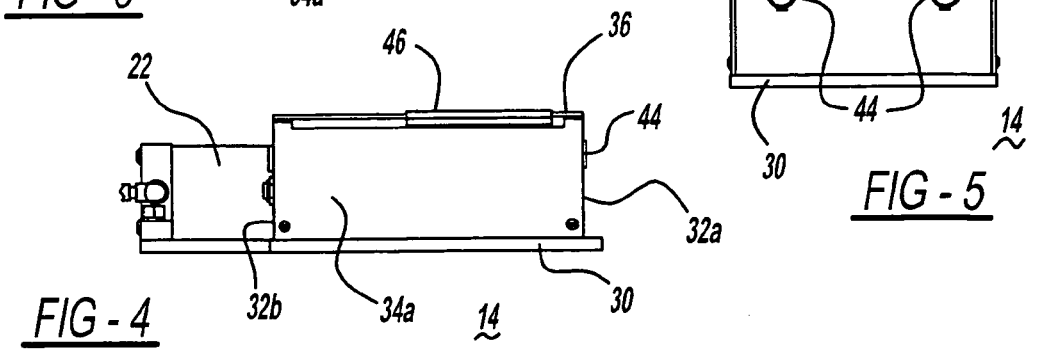
FIG - 4
FIG - 5

BELTLESS CONVEYOR SYSTEM

CROSS REFERENCE TO RELATED APPLICATIONS

This application claims the benefit of provisional application Ser. No. 61/125,491 filed on Apr. 25, 2008.

BACKGROUND OF THE INVENTION

The embodiments of the present invention described herein relate to beltless conveyor systems for moving materials from one location to another.

SUMMARY OF THE INVENTION

In one aspect, embodiments of the present invention include a conveyor assembly having a mounting assembly for moving a material to be conveyed. The mounting assembly is movable in a first direction and in a second direction opposite the first direction. At least one resiliently deformable spring member is provided for storing energy therein responsive to a motion of the mounting assembly in the second direction. Energy stored in the spring member is usable to urge the mounting assembly and the associated material in the first direction.

In another aspect of the embodiments of the present invention, a method is provided for operating a conveyor so as to move a material in a first direction. The method includes the steps of providing a mounting assembly movable in the first direction and in a second direction opposite the first direction for positioning the material thereon; providing at least one spring member resiliently deformable for storing energy therein responsive to a motion of the mounting assembly in the second direction; urging the mounting assembly in the second direction to a first position to resiliently deform the spring member; and releasing the mounting assembly to enable movement of the mounting assembly in the first direction by a force exerted on the mounting assembly by the deformed spring member as the spring member returns to an undeformed state, thereby moving a material positioned on the mounting assembly in the first direction.

BRIEF DESCRIPTION OF THE DRAWINGS

FIG. 1 is a schematic view of a beltless conveyor system in accordance with one embodiment of the present invention.

FIG. 2 is a perspective view of a conveyor assembly in accordance with one embodiment of the present invention.

FIG. 3 is a plan view of the embodiment shown in FIG. 1.

FIG. 4 is a side view of the embodiment shown in FIG. 1.

FIG. 5 is an end view of the embodiment shown in FIG. 1.

DETAILED DESCRIPTION

Referring to FIGS. 1-9, a beltless conveyor system 10 in accordance with one embodiment of the present invention includes a control system 12 and a conveyor assembly 14 coupled to the control system for moving material positioned thereon responsive to commands from a user and/or the control system.

Figure 6:
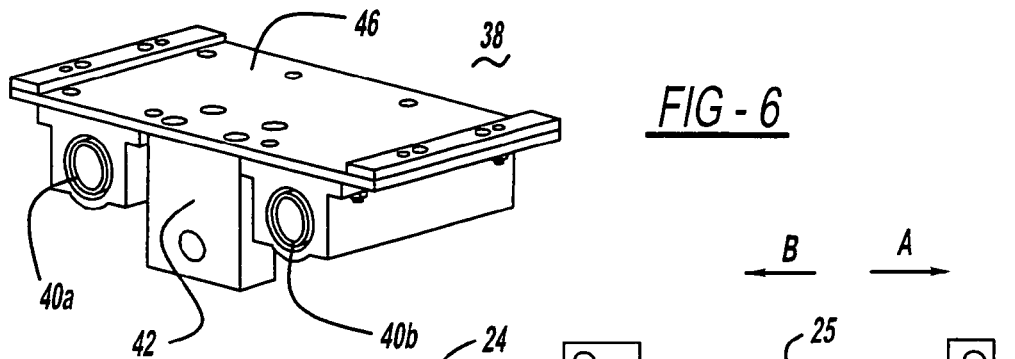
FIG. 6 is a perspective view of a mounting assembly in accordance with one embodiment of the present invention.

Control system 12 includes a commercially-available, double solenoid-operated four-way valve 16 for regulating airflow to the conveyor assembly, and a controller 18 operatively coupled to the valve 16 for controlling valve actuation. Actuation of the valve 16 responsive to commands from controller 18 and/or a user controls operation of a mechanism (for example, an air cylinder 22 as shown in FIG. 6) for moving a portion of the conveyor system including a table or tray 20 (see FIG. 9) on which a material 100 is placed for movement. In the embodiments shown herein, tray 20 is operatively coupled to a shaft of the air cylinder so as to move in conjunction therewith. The inlets of valve 16 are operatively coupled to a source of pressurized air, and the outlets of valve 16 are operatively coupled to the air cylinder.

Controller 18 controls actuation of solenoid valve 16. Controller 18 may be any device capable of performing the control functions required for operation of the conveyor assembly as described herein. Controller 18 may be programmable directly by a user and/or may be capable of receiving control commands from an external or remote source (for example, a remotely located user, a computer, or another device or system). In one embodiment, controller is a programmable logic controller (PLC) having a screen display and a user interface such as a visual screen display and keypad to enable system programming or the input of system commands by a user. In another example, the control functions are performed by a programmable relay available from any of a variety of vendors, such as Rockwell Automation or Allen-Bradley. In a particular embodiment (not shown), diodes are operatively positioned between the relay and the solenoids to aid in protecting the relay from spikes in current.

In a particular embodiment of the conveyor system described herein, elements of the conveyor system are modular, and the conveyor assembly 14 may be physically detached from the control system 12. This enables a malfunctioning conveyor assembly 14 to be disassembled for repair or replaced in the conveyor system by another conveyor assembly 14, which can be easily connected to the control system. The valve 16 is also physically separable from the controller 18 and conveyor assembly 14. This modularity aids in minimizing the replacement costs of any element of the system, because there is no need to replace an entire integrated unit or assembly.

Controller 18 may be programmed or receive commands through a manual interface 13. Controller 18 may also receive commands from one or more external sources 11. These external sources may include, for example, a device, a group of devices, or another system coupled to the conveyor system. The signals received from external sources 11 may include, for example, sensor data for use by controller 18 in generating an appropriate conveyor system instruction, or commands generated from outside the conveyor system.

Figure 7:
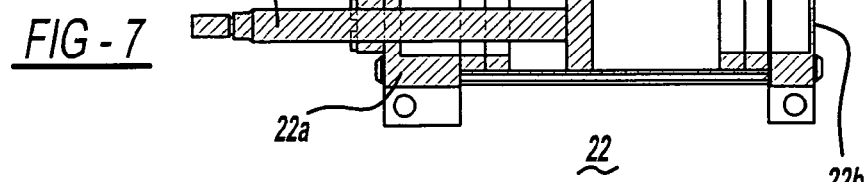
FIG. 7 is a cross-sectional side view of an air cylinder incorporated into the embodiment shown in FIG. 2.

Referring to FIGS. 1 and 7, the stroke length of the air cylinder shaft 24 is controlled by controller 18 responsive to a timing signal from a first timer 26 incorporated into or operatively coupled to the controller. Similarly, the dwell time of the shaft 24 in any given position is controlled by controller 18 responsive to a timing signal from a second timer 28 incorporated into or operatively coupled to the controller. The controller 18 provides actuation signals to the solenoid valve 16 responsive to the timer signals. Alternatively, switching of the solenoid valve 16 may be responsive to a signal received directly from either or both of timers 26 and 28. A known air filter and regulator package (not shown) may be coupled to the compressed air supply for the cylinder.

Each of timers 26 and 28 comprises a circuit or device suitable for generating timing signals usable for actuating the air cylinder in accordance with set-up commands received from controller 18, from a user, and/or from another source according to design and operational requirements. The timers 26 and 28 may be incorporated into the controller or the timers may be separate from the controller.

The overall speed with which the material is conveyed will depend on such factors as the dwell time, the speed of movement of the cylinder shaft 24 (to which the tray 20 is connected), and the total distance which the tray 20 is to be moved by shaft 24 during the forward and reverse strokes of the shaft. The dwell time is controlled by timer 28, and the total distance which the tray 20 is to be moved during the forward and reverse strokes of the shaft is controlled by temporal start and stop points determined by the settings of timer 26. In a particular embodiment, the overall material travel speed is set by adjustment of the settings of timers 26 and 28 responsive to an output voltage (or control voltage) of a potentiometer (not shown) operatively coupled to the timers. The controller 18 is configured to adjust the settings of timers 26 and 28 corresponding to the potentiometer output voltage, so that a predetermined output voltage of the potentiometer corresponds to an associated material travel speed. In this manner, any of a continuous range of travel speeds may be provided. In addition, the material travel speed can be adjusted manually by turning a knob on a control panel. Alternatively, the control voltage may be generated by another element of the conveyor system or by an element external to the conveyor system, according to the requirements of a particular application. If desired, the system may be configured to limit the control voltage to within a predetermined range, so that the settings of timers 26 and 28 are correspondingly limited to within predetermined ranges. Increasing the time setting on the dwell timer 28 will increase the time between strokes, resulting in fewer strokes per unit time and less air usage. The distance the material moves per stroke is essentially unchanged.

In a particular embodiment, the first timer 26 is pre-programmed by the conveyor system vendor, and is not re-programmable in the field.

In a particular embodiment, the second timer 28 is operatively connected to a user-accessible potentiometer (not shown), thereby enabling the dwell time of the cylinder shaft 24 to be altered by turning a knob on a control panel.

In a particular embodiment, the direction of travel of material 100 placed on the conveyor system is controlled by selective actuation of the solenoid responsive to a signal received from the controller 18. A switch, such as a "forward/reverse" selector switch may be incorporated into a control panel, enabling selection of the material travel direction by a user. Alternatively, the signal controlling travel direction may be automatically generated based on an input or inputs to the controller, according to the requirements of a particular application.

Referring now to FIGS. 2-5, the conveyor assembly 14 includes a base plate 30, air cylinder 22 secured to the base plate, a pair of opposed endplates 32*a* and 32*b*, a pair of opposed side plates 34*a*, 34*b* coupled to the endplates, and a top plate 36 coupled to the end plates and/or side plates to form an enclosure, generally designated 33. A pair of guide rods 44 is mounted between end plates 32*a*, 32*b*.

Figure 9:
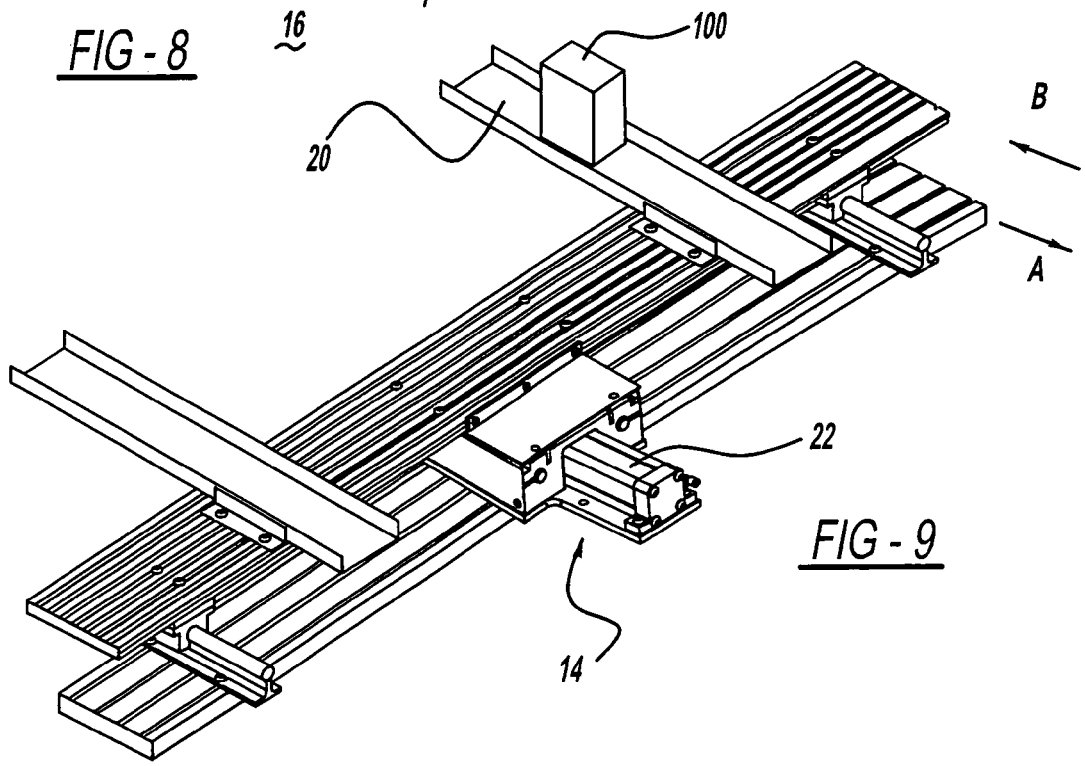
FIG. 9 is a perspective view of a tray system mounted on the embodiment shown in FIG. 1.
Figure 10:
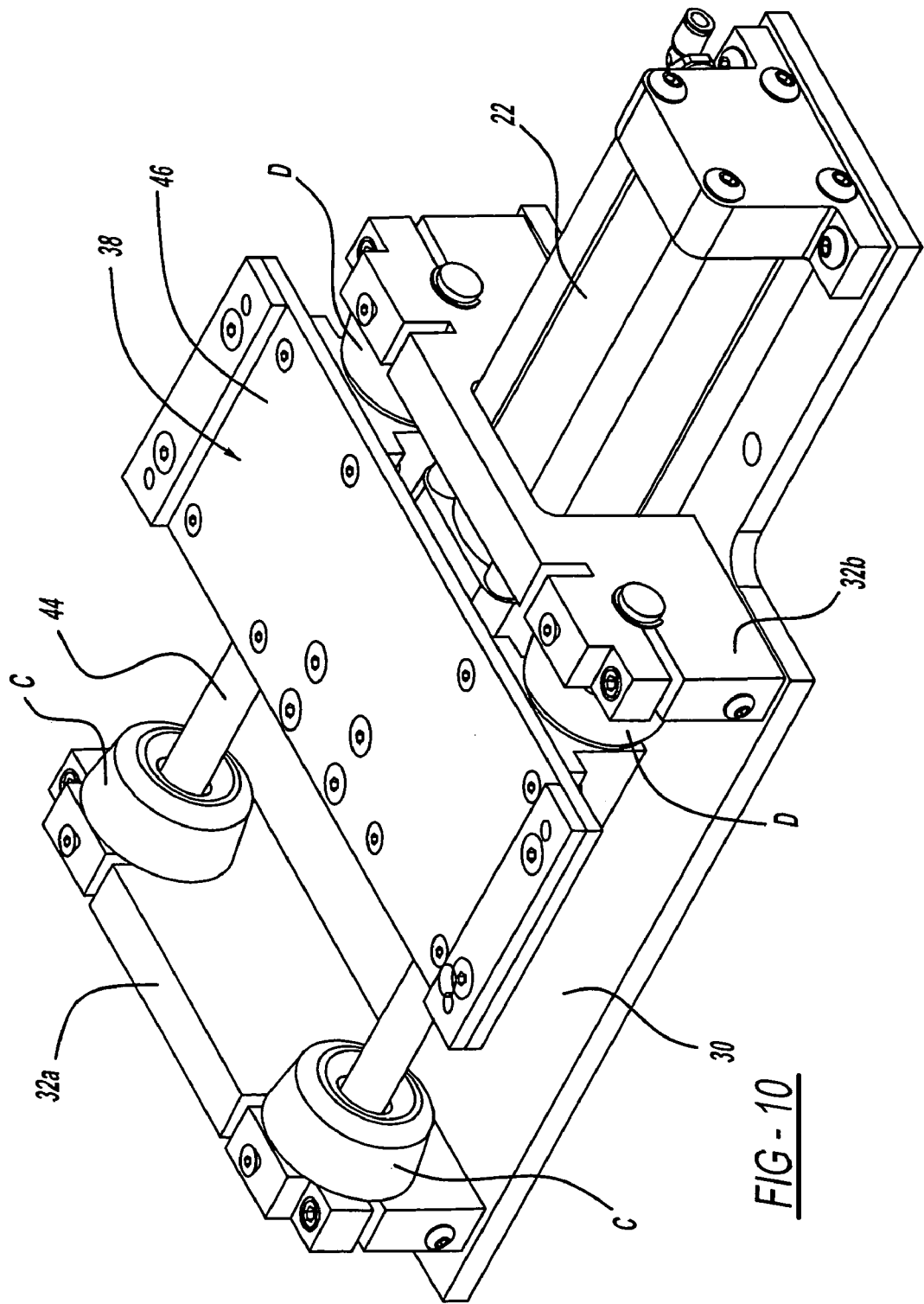
FIG. 10 is an isometric view showing the interior of a conveyor assembly in accordance with an embodiment of the present invention.

Referring now to FIG. 6, conveyor assembly 14 also includes a tray mounting assembly 38 formed from a mounting plate 46, a pair of ball bushing or bearing assemblies 40*a*, 40*b* attached to the mounting plate, and a mounting bracket 42 attached to the mounting plate. In conveyor assembly 14, bushing assemblies 40*a*, 40*b* slide along respective ones of guide rods 44. Mounting bracket 42 connects to the shaft 24 of the air cylinder 22. Thus, motion of shaft 24 produces a corresponding motion of mounting assembly 38. Ball bushings 40*a*, 40*b* and guide rods 44 support the material being moved and the trays and framework that carry the material. Bushings 40*a*, 40*b* and guide rods 44 also aid in isolating the cylinder from loads resulting from movement of the material positioned on the tray, and from movement of the trays and framework that carry the material. Referring to FIG. 9, a table or tray assembly 20 is secured to mounting plate 46 to serve as a material transport medium.

Referring to FIG. 4, spring members C and D are secured within the enclosure between bushing assemblies 40*a*, 40*b* and respective ones of end plates 32*a* and 32*b*. Spring members C and D are compressed, stretched, or otherwise deformed so as to store energy which is used to impart a pre-load to the conveyor system for use in initiating motion of the mounting assembly. During operation of the conveyor system, the mounting assembly 38 is urged against either spring members C or spring members D at the end of each motion cycle to compress the spring members prior to reversing the direction of motion of the mounting assembly. In the embodiment shown in FIGS. 4 and 11A-11D, spring members C and D are any compression spring members suitable for the purposes described herein. Some examples of suitable spring members are coil springs and spring members formed from a rubber, foam, or other resiliently compressible material. For purposes of illustration, the embodiments disclosed herein are shown using resilient cushions as spring members. The embodiments shown herein also incorporate two spring members. Alternatively, a single spring member may be used or more than two spring members may be used, depending on the configuration of the particular system and the requirements of a particular application.

Operation of a conveyor system in accordance with an embodiment of the present invention will now be discussed with reference to FIGS. 11A-11D. The embodiments of the present invention described herein implement a timed motion and shift cycle using the controller 18, air cylinder 22, and other elements previously described.

Figure 11A:
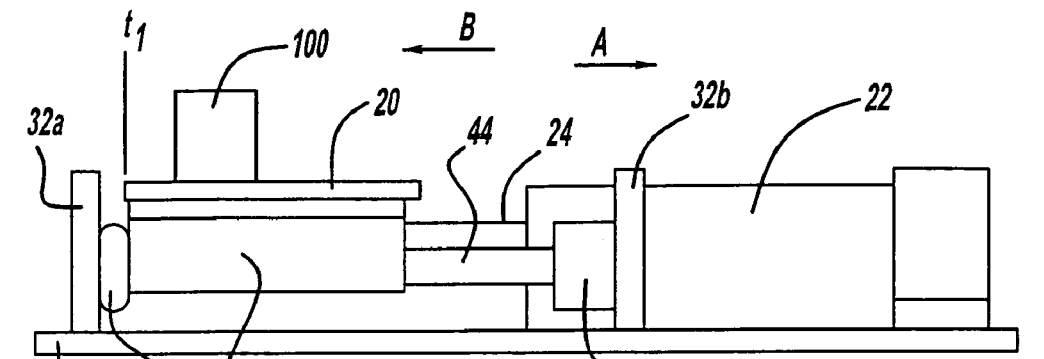
FIGS. 11A-11D show operation of a conveyor system in accordance with an embodiment of the present invention.

Referring to FIG. 11A, motion (in the direction indicated by arrow "A") of an object or a quantity of material 100 positioned on the conveyor is generated by selection of a desired tray speed. The tray speed may be selected manually or automatically based on a predetermined set of criteria, according to the requirements of a particular application.

When it is desired to move the tray material in direction "A", the tray 20 may be loaded when spring members C are already compressed. Compression of spring members C will be described as a prelude to motion of tray material 100 in direction "A". However, it is understood that spring members D could be pre-compressed in the same manner as described if it is desired to move the tray material 100 in direction "B".

Figure 8:
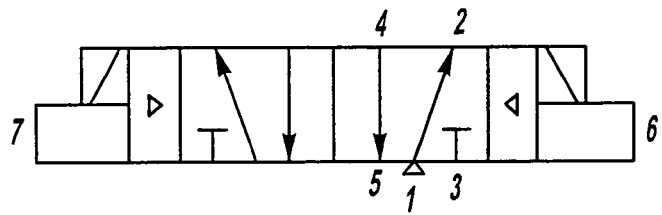
FIG. 8 is a schematic view of a solenoid valve assembly incorporated into the embodiment shown in FIG. 1.

Referring to FIG. 11A, to compress spring members C prior to movement of the material 100 in direction "A", the desired tray speed is selected, either manually or automatically. Selection of a desired tray speed results in actuation by controller 18 of solenoid 6 in solenoid valve 16 (FIG. 8). This permits compressed air to flow through valve port 1 to cylinder port 2 (FIG. 7). Valve port 4 is opened to exhaust air from the interior of the cylinder between piston 25 and an end wall 22*a* of the cylinder housing through which the shaft protrudes. The cylinder piston 25 moves in the direction indicated by arrow "B", driving the mounting assembly 38 coupled to cylinder shaft 24 into spring members C and compressing the spring members to pre-load the spring members. The cylinder shaft comes to a stop with spring members C resiliently compressed by mounting assembly 38 until expiration of the dwell time period. FIG. 11A shows mounting assembly 38 at $t_1$, the beginning of a direction "A" motion cycle, with spring members C pre-compressed.

After the dwell timer period expires, a signal indicating expiration of the timing period is sent to solenoid 7, activating the solenoid. This opens cylinder port 2 to exhaust gas from the cylinder interior between piston 25 and cylinder end wall 22b, and also opens cylinder port 4 to permit pressurization of the cylinder interior between the cylinder end wall 22a and piston 25.

Generally, there is a delay between reversal of airflow direction by the controller and initiation of mounting assembly motion while the internal cylinder pressure between the end wall 22b and piston 25 is relieved, and the pressure between endwall 22a and piston 25 builds up. However, because spring members C are present and are pre-compressed by the mounting assembly, as air is exhausted from the cylinder interior, the force compressing spring member C is released, permitting spring members C to decompress or expand. Decompression or expansion of spring members C imparts a slow starting acceleration to piston 25 and to the attached cylinder shaft 24 and mounting assembly 38 as the internal cylinder pressure between the end wall 22b and piston 25 is relieved, allowing the cylinder shaft 24 to move in the direction indicated by arrow "A". In the manner described above, pre-compression of the spring members C by the mounting assembly 38 prior to reversal of the airflow direction enables motion of the mounting assembly to be initiated as soon as the cylinder internal pressure on the opposite side of the piston 25 has fallen enough to enable the piston to move in direction A. This reduces or obviates the above-mentioned delay in initiation of mounting assembly motion.

Figure 11B:
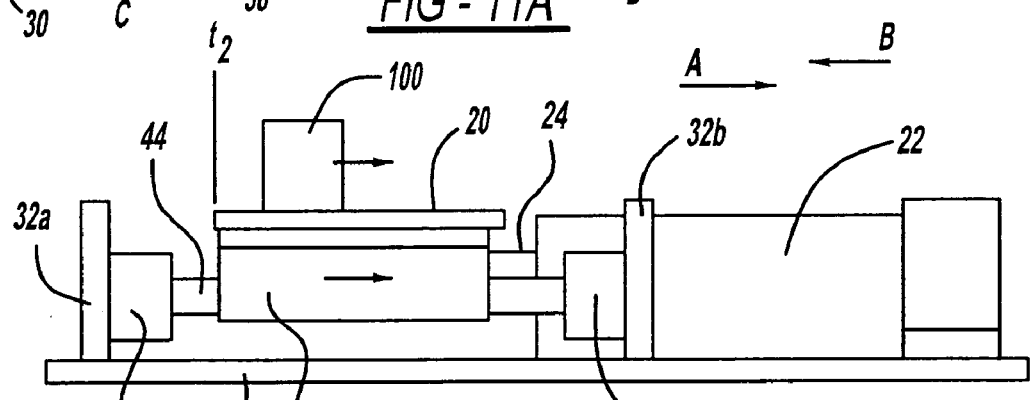

Referring to FIG. 11B, the mounting assembly 38 and tray 20 coupled to shaft 24 now accelerate in direction "A". Since the decompressing spring member C initiates the motion of the mounting assembly 38 and tray 20 at a relatively slow rate, the static frictional connection between the material and the tray is not broken and the material moves with the tray instead of sliding along the tray. The cylinder shaft 24 continues to move in the direction indicated by arrow "A" until expiration of a predefined stroke time period (as determined by first timer 26). FIG. 11B shows the position of mounting assembly 38 at $t_2$, the end of the stroke timer period.

Figure 11C:
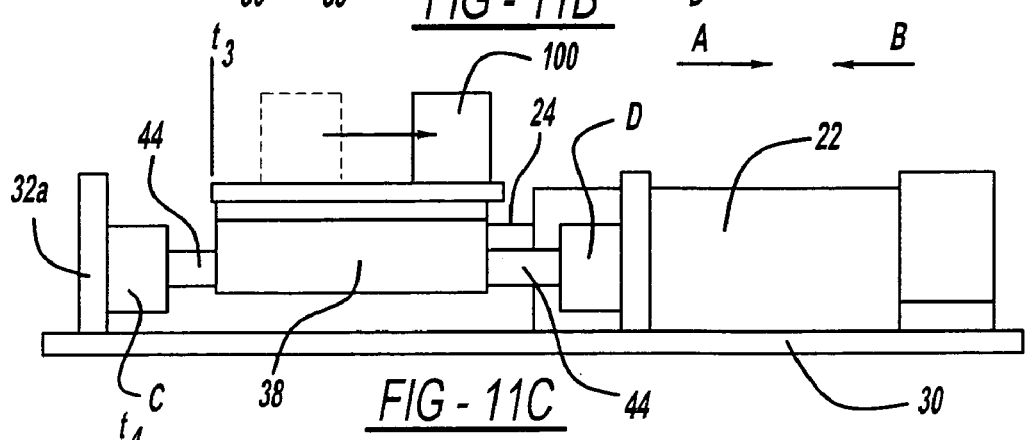

Referring to FIG. 11C, at the end of the predetermined stroke time period, controller 18 again actuates solenoid 6 in solenoid valve 16 (FIG. 8). This permits compressed air to flow through valve port 1 to cylinder port 2 (FIG. 7). Valve port 4 is opened to exhaust air from the interior of the cylinder between piston 25 and an end wall 22a of the cylinder housing through which the shaft protrudes, and to permit the cylinder interior between piston 25 and end wall 22b to be pressurized. The cylinder piston 25 again moves in the direction indicated by arrow "B", driving the mounting assembly 38 coupled to cylinder shaft 24 into spring members C and compressing the spring members to pre-load the spring members.

The reversal of shaft direction occurs before the cylinder shaft 24 reaches the end of its stroke (i.e., prior to the point at which maximum travel of the shaft in direction "A" has occurred) and before the mounting assembly 38 reaches spring members D. Due to the suddenness with which the shaft stops and the dynamic inertia of the material 100 in direction "A", the static frictional connection between the material 100 and the tray 20 is overcome. Thus, the material 100 continues to move in direction "A" (see FIG. 11C) after the shaft 24 stops and as the tray 20 moves out from under the material 100 in direction "B". FIG. 11C shows the position of mounting assembly 38 at $t_3$, after material 100 has moved along tray 20 in direction "A" and just prior to the reversal of direction of mounting assembly 38.

Figure 11D:
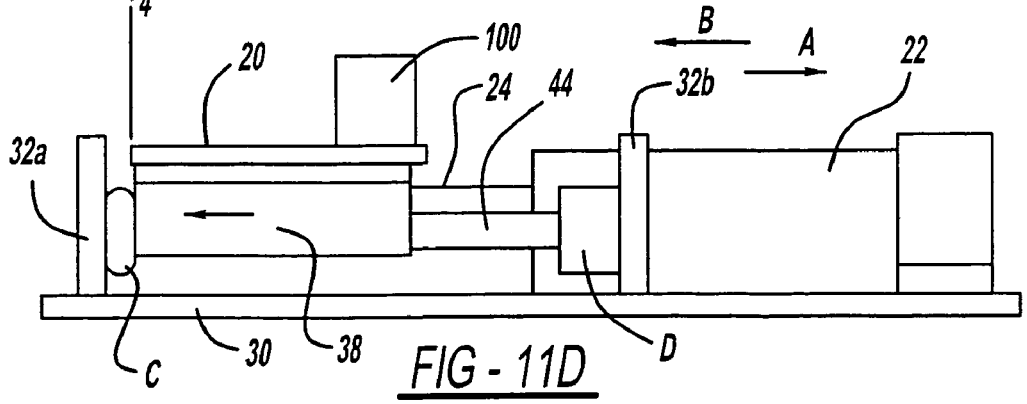

Referring to FIG. 11D, the piston 25 and tray 20 continue traveling in direction "B" until the shaft 24 reaches the end of its stroke, compressing spring member C again to pre-load the spring member. The piston 25 then dwells in this position until expiration of the dwell timing period causes the piston to begin another motion cycle in direction "A", as previously described. FIG. 11D shows mounting assembly 38 at $t_4$, the end of the previously described stroke and prior to the beginning of a new stroke cycle, with spring members C pre-compressed again.

The above sequence is repeated until the material is conveyed off of the tray in direction "A".

Reversing the direction of travel of the material 100 may be accomplished by a manual or automatically generated signal to controller 18. The controller then generates a signal actuating the solenoid to control the compressed air flow to cycle the mounting assembly position so as to provide the desired material motion. Operation of the system to move the material in direction "B" is essentially opposite of that described above, with the mounting assembly piston initially being driven into spring members D to compress the spring member, and the mounting assembly being retained in this position until the dwell timing period expires. Also, in this operational mode, the piston and shaft reverse direction before the mounting assembly contacts spring members C.

The compressed air pressure setting controls the energy imparted to the system for moving the connected load and the conveyed load. The connected load is defined as the load imposed by the elements of the conveyor system (such as the mounting assembly, any support bearings (not shown), and any trays mounted thereon) which are moved by the air cylinder during operation of the system. In order to move the material, sufficient air pressure must be provided to overcome the static inertia of the connected and conveyed loads. It is also desirable that the pressure setting not be so high that braking of the system elements comprising the connected load becomes prohibitive due to excessive dynamic inertia generated during the movement portion of the cycle. The compressed air pressure and speed control settings may be independently adjusted to achieve the most efficient operational mode for a given system loading. The precise settings for a particular system loading may be iteratively determined based on such factors as the desired conveyor speed and the magnitudes of the connected and conveyed loads.

In a particular embodiment, any desired conveyor speed within a predetermined range can be achieved using a compressed air supply pressure setting between 20 and 60 PSIG.

In another particular embodiment, the on/off function of the system is controlled by a selector switch that can be coupled to another controller or device (for example, a controller for a stamping press) to receive an actuation signal therefrom, if desired.

In another particular embodiment, there are three predetermined conveyor speeds to choose from. The controller automatically sets the stroke length and dwell timers to provide an optimum cycle time for each predetermined conveyor speed.

In another particular embodiment (not shown), the conveyor control system has an option that allows it to control two separate conveyor assemblies to enable, for example, two different directions of material travel simultaneously.

The controller 18 in the system embodiments described herein allows the conveyor system to be electronically connected to other electronic machine controls so that it can be turned on or off in conjunction with other equipment, if desired. Also, because the system controls are electronic, an additional valve can coupled to the controller to permit two cylinders (and therefore two conveyor assemblies) to be operated from the same controller. This enables synchronization of the motions of the cylinders to optimize conveying capacity. The two conveyor assemblies can be installed to convey material in parallel, in opposite directions, or even in oblique directions with respect to each other.

As stated previously, for purposes of illustration, the embodiments disclosed herein are shown using resilient cushions as spring members. However, any other suitable type of spring member may be used, according to the requirements of a particular application. For example, in an alternative embodiment (not shown), a pusher plate is positioned within enclosure 33 and is movably coupled to base plate 30 by one or more tension spring members (for example, coil springs). At the beginning of a mounting assembly motion cycle, the mounting assembly 38 is forced against the pusher plate so as to stretch or extend the tension spring members, thereby imparting a pre-load which bears against the mounting assembly as previously described. When the motion cycle is initiated by the controller, pressure exerted on the pusher plate by the mounting assembly is relieved, and the energy stored in the spring member(s) is expended to provide initial motion of the mounting assembly in the same manner as previously described.

In a particular embodiment, a hard stop (not shown) is provided against which the mounting assembly 38 may abut to limit motion of the mounting assembly 38 in direction "B", thereby effectively limiting the compression (or tension) in the spring member(s). The position of the hard stop may be adjustable (for example, using a threaded mounting) to enable the deflection of the spring member(s) (and the energy stored in the spring members) to be tailored to the requirements of a particular application. By this method, the amount of spring force acting on the mounting assembly 38 can be adjusted and controlled with some consistency.

In addition, the system elements described herein are scalable, and additional load bearing capacity or conveyor length may be provided by sizing the components and adding components accordingly.

It will be appreciated that the various constituents described above are formed in known manners. For example, the various components may be molded. stamped or otherwise metal formed from carbon steel, aluminum, metallic alloys, or any of a variety of polymers.

It will be understood that the foregoing description of embodiments of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A conveyor assembly comprising:
    a mounting assembly for moving a material to be conveyed, the mounting assembly being movable in a first direction;
    at least one spring member operatively coupled to the mounting assembly so as to enable the at least one spring member to exert a force on the mounting assembly tending to move the mounting assembly in the first direction; and,
    means, separate from the at least one spring member, for applying a force to the mounting assembly so as to maintain the mounting assembly in a fixed position for at least a predetermined dwell time period against a force exerted on the mounting assembly by the at least one spring member.

2. The conveyor assembly of claim 1 further comprising a moving mechanism operatively coupled to the mounting assembly for moving the mounting assembly when a spring force is not exerted on the mounting assembly.

3. The conveyor assembly of claim 2 wherein the moving mechanism comprises an air cylinder.

4. The conveyor assembly of claim 1 wherein the mounting assembly is movable to a first end position to contact the at least one spring member to resiliently deform the at least one spring member, thereby causing the at least one spring member to exert a reaction force on the mounting assembly.

5. The conveyor assembly of claim 1 wherein the at least one spring member is a compression spring member.

6. The conveyor assembly of claim 5 wherein the at least one spring member is a resilient cushion.

7. A conveyor system including a conveyor assembly in accordance with claim 1.

8. The conveyor system of claim 7 further comprising a control system for controlling the moving mechanism.

9. The conveyor system of claim 8 wherein the mounting assembly is physically separable from the control system.

10. The conveyor system of claim 8 wherein the mounting assembly is physically separate from the control system.

11. A method for operating a conveyor to move a material positioned on the conveyor in a first direction, comprising the steps of:
    providing a mounting assembly for positioning the material thereon, the assembly being movable in the first direction and in a second direction opposite the first direction, the assembly being movable between a first end position and a second end position;
    providing at least one spring member operatively coupled to the mounting assembly and positioned to exert a force on the mounting assembly when the mounting assembly is in the first end position;
    providing a moving mechanism structured to move the mounting assembly in the absence of a force applied to the mounting mechanism by the at least one spring member;
    maintaining the mounting assembly in the first end position against a force exerted by the at least one spring member for a first predetermined time period prior to release of the mounting assembly;
    after release of the mounting assembly, exerting a force on the mounting assembly by the at least one spring member sufficient to move the mounting assembly a first portion of a distance between the first end position and the second end position; and
    exerting a force on the mounting assembly by the moving mechanism and without the at least one spring member during a movement of the mounting assembly a second portion of the distance between the first end position and the second end position.

12. The method of claim 11 further comprising the steps of:
    urging the mounting assembly in the first direction for a second predetermined time period after release of the mounting assembly; and stopping motion of the mounting assembly in the first direction after expiration of the second predetermined time period such that an inertia of the material in the first direction overcomes a static frictional force between the mounting assembly and the material, thereby producing a displacement of the material along the mounting assembly in the first direction.

13. The method of claim 11 wherein the mounting assembly is maintained in the first end position for a first predetermined time period prior to release of the mounting assembly.

14. The method of claim 11 further comprising the step of exerting a force by the moving mechanism and without the at least one spring member on the mounting assembly during a movement of the mounting assembly in the second direction from the second end position to the at least one spring member.

\* \* \* \* \*